US011153722B2

United States Patent
Kim et al.

(10) Patent No.: US 11,153,722 B2
(45) Date of Patent: Oct. 19, 2021

(54) METHOD BY WHICH TERMINAL RECEIVES MBMS SERVICE AND APPARATUS FOR SUPPORTING SAME

(71) Applicant: LG Electronics Inc., Seoul (KR)

(72) Inventors: Sangwon Kim, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 24 days.

(21) Appl. No.: 16/325,655

(22) PCT Filed: Aug. 17, 2017

(86) PCT No.: PCT/KR2017/008945
§ 371 (c)(1),
(2) Date: Feb. 14, 2019

(87) PCT Pub. No.: WO2018/043961
PCT Pub. Date: Mar. 8, 2018

(65) Prior Publication Data
US 2019/0208369 A1   Jul. 4, 2019

Related U.S. Application Data

(60) Provisional application No. 62/380,990, filed on Aug. 29, 2016.

(30) Foreign Application Priority Data

Aug. 2, 2017 (KR) .................. 10-2017-0097955

(51) Int. Cl.
*H04W 4/06* (2009.01)
*H04W 24/02* (2009.01)
(Continued)

(52) U.S. Cl.
CPC ............... *H04W 4/06* (2013.01); *H04W 4/20* (2013.01); *H04W 24/02* (2013.01); *H04W 24/10* (2013.01); *H04L 12/189* (2013.01)

(58) Field of Classification Search
None
See application file for complete search history.

(56) References Cited

U.S. PATENT DOCUMENTS

2005/0042987 A1* 2/2005 Lee ..................... H04W 72/005
455/67.11
2010/0272004 A1* 10/2010 Maeda ............. H04W 72/0466
370/312
(Continued)

FOREIGN PATENT DOCUMENTS

EP           3001744 A1 *  3/2016  .......... H04W 72/005
WO        2015122665         8/2015
(Continued)

OTHER PUBLICATIONS

Extended European Search Report in European Application No. 17846886.4, dated Nov. 22, 2019, 9 pages.
(Continued)

*Primary Examiner* — Alex Skripnikov
*Assistant Examiner* — Richard Schnell
(74) *Attorney, Agent, or Firm* — Fish & Richardson P.C.

(57) ABSTRACT

Disclosed are a method by which a terminal receives an MBMS service and an apparatus for supporting the same. The method comprises the steps of: determining a coverage enhancement (CE) level of the terminal in a frequency at which an MBMS service of interest is provided; receiving a CE level of the MBMS service supported by a network; determining whether the MBMS service can be received by comparing the CE level of the terminal with the CE level of the MBMS service; and reporting, to the network, the CE level of the terminal or the number of iterations, which is
(Continued)

indicated by the CE level of the terminal, required for the terminal when it is determined that the MBMS service cannot be received.

6 Claims, 11 Drawing Sheets

(51) Int. Cl.
*H04W 4/20* (2018.01)
*H04W 24/10* (2009.01)
*H04L 12/18* (2006.01)

(56) References Cited

U.S. PATENT DOCUMENTS

| | | |
|---|---|---|
| 2016/0014571 A1 | 1/2016 | Lee et al. |
| 2017/0079009 A1* | 3/2017 | Saxena ............. H04W 72/0406 |
| 2017/0105166 A1* | 4/2017 | Lee .................... H04W 68/005 |
| 2018/0014246 A1* | 1/2018 | Chang .................. H04W 48/18 |
| 2018/0069652 A1* | 3/2018 | Yamamoto ............ H04L 1/0009 |
| 2019/0222969 A1* | 7/2019 | Fujishiro ................. H04W 4/06 |
| 2019/0246254 A1* | 8/2019 | Chatterjee ............. H04L 5/0053 |

FOREIGN PATENT DOCUMENTS

| | | |
|---|---|---|
| WO | 2016025836 | 2/2016 |
| WO | 2016122193 | 8/2016 |
| WO | WO2016122193 | 8/2016 |

OTHER PUBLICATIONS

Huawei, HiSilicon, "Coverage Enhancement for SC-PTM in FeMTC," R2-165385, 3GPP TSG-RAN WG2 Meeting #95, Gothenburg, Sweden, dated Aug. 22-26, 2016, 2 pages.

Qualcomm Incorporated, "Proposal for paging for coverage enhancement in LTE," S2-153313, 3GPP TSG-SA WG2 Meeting #111, Chengdu, P.R. China, dated Oct. 19-23, 2015, 4 pages.

LG Electronics Inc., "Considerations on coverage enhancement level," 'R2-154448', 3GPP TSG-RAN2 Meeting #91bis, Malmo, Sweden, Oct. 5-9, 2015, 4 pages.

* cited by examiner

METHOD BY WHICH TERMINAL RECEIVES MBMS SERVICE AND APPARATUS FOR SUPPORTING SAME

CROSS-REFERENCE TO RELATED APPLICATIONS

This application is a National Stage application under 35 U.S.C. § 371 of International Application No. PCT/KR2017/008945, filed on Aug. 17, 2017, which claims the benefit of Korean Application No. 10-2017-0097955, filed on Aug. 2, 2017, and U.S. Provisional Application No. 62/380,990, filed on Aug. 29, 2016. The disclosures of the prior applications are incorporated by reference in their entirety.

BACKGROUND OF THE INVENTION

Field of the Invention

The present invention relates to a method for successfully receiving an MBMS service when a user equipment (UE) cannot receive an MBMS service of interest.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. The 3GPP LTE adopts MIMO (multiple input multiple output) having maximum four antennas.

The 3GPP LTE can provide a multimedia broadcast multicast service (MBMS) service. The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

Recently, various coverage enhancement techniques, such as a repeated transmission method for a UE per channel/signal, have been discussed. A coverage enhancement level (hereinafter, "CE level") may change depending on the location of a UE in a cell and the signal quality of the UE in the cell. A different CE level refers to a different number of repetitions (resources or subframes) required for successful uplink transmission and downlink reception. For a UE, it is advantageous in view of power consumption to stay in a cell requiring a smaller number of repetitions for successful uplink transmission and downlink reception. Therefore, a network needs to provide the number of repetitions required by a UE so that the UE successfully receives an MBMS service in enhanced coverage.

SUMMARY OF THE INVENTION

When the number of repetitions required by a user equipment (UE) located in enhanced coverage is not supported, the UE cannot successfully receive an MBMS service. Therefore, a network needs to know information about the number of repetitions required by the UE in order to successfully receive the MBMS service.

According to one embodiment of the present invention, there is provided a method for receiving, by a UE, an MBMS service in a wireless communication system, the method including: determining the coverage enhancement (CE) level of the UE on a frequency via which an MBMS service of interest is provided; receiving the CE level of the MBMS service supported by a network; judging whether the MBMS service can be received by comparing the CE level of the UE with the CE level of the MBMS service; and reporting the CE level of the UE or the number of repetitions required for the UE indicated by the CE level of the UE to the network when it is determined that the MBMS service cannot be received.

The judging may include judging that the MBMS service cannot be received when the CE level of the MBMS service is lower than the CE level of the UE.

The reporting may be triggered under the condition that a frequency for providing the MBMS service is different from a current serving frequency for the UE.

The CE level of the UE may be determined based on reference signal received power (RSRP) or reference signal received quality (RSRQ) measured by the UE.

The CE level may be reported per multi broadcast multi service (MBMS) service, temporary mobile group identity (TMGI), frequency for providing the MBMS service, or mobile broadcast single frequency network (MBSFN) area.

The CE level or the number of repetitions of the UE may be reported through an MBMS interest indication message or an MBMS counting response message.

The CE level or the number of repetitions of the MBMS service may be received through a multicast control channel (MCCH), a single cell-MCCH (SC-MCCH), or a physical downlink control channel (PDCCH).

The method may further include initiating a radio resource control (RRC) connection establishment procedure before the reporting when the UE is in an RRC idle state.

The judging may include judging whether the MBMS service can be received through MBSFN transmission or single cell-point to multipoint (SC-PTM) transmission.

The CE level of the MBMS service may be received via system information block type 13 (SIB13).

According to another embodiment of the present invention, there is provided a UE for receiving an MBMS service in a wireless communication system, the UE including: a memory; a transceiver; and a processor to connect the memory and the transceiver, wherein the processor is configured to: determine the CE level of the UE on a frequency via which an MBMS service of interest is provided; receive the CE level of the MBMS service supported by a network; judge whether the MBMS service can be received by comparing the CE level of the UE with the CE level of the MBMS service; and report the CE level of the UE or the number of repetitions required for the UE indicated by the CE level of the UE to the network when it is determined that the MBMS service cannot be received.

The processor may judge that the MBMS service cannot be received when the CE level of the MBMS service is lower than the CE level of the UE.

The processor may trigger reporting the CE level under the condition that a frequency for providing the MBMS service is different from a current serving frequency for the UE.

The processor may report the CE level or the number of repetitions of the UE per MBMS service, TMGI, frequency for providing the MBMS service, or MBSFN area.

According to still another embodiment of the present invention, there is provided a method for receiving, by a UE, an MBMS service in a wireless communication system, the method including: determining the number of repetitions required for the UE on a frequency via which an MBMS service of interest is provided; receiving the number of repetitions of the MBMS service supported by a network; judging whether the MBMS service can be received by comparing the number of repetitions of the UE with the number of repetitions of the MBMS service; and reporting the number of repetitions of the UE or the CE level of the UE corresponding to the number of repetitions to the network when it is determined that the MBMS service cannot be received.

According to embodiments of the present invention, when the CE level of an MBMS service or the number of repetitions supported by a network does not satisfy the CE level of a UE or the required number of repetitions, the CE level of the UE or the required number of repetitions is reported to the network, thereby successfully receiving the MBMS service.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
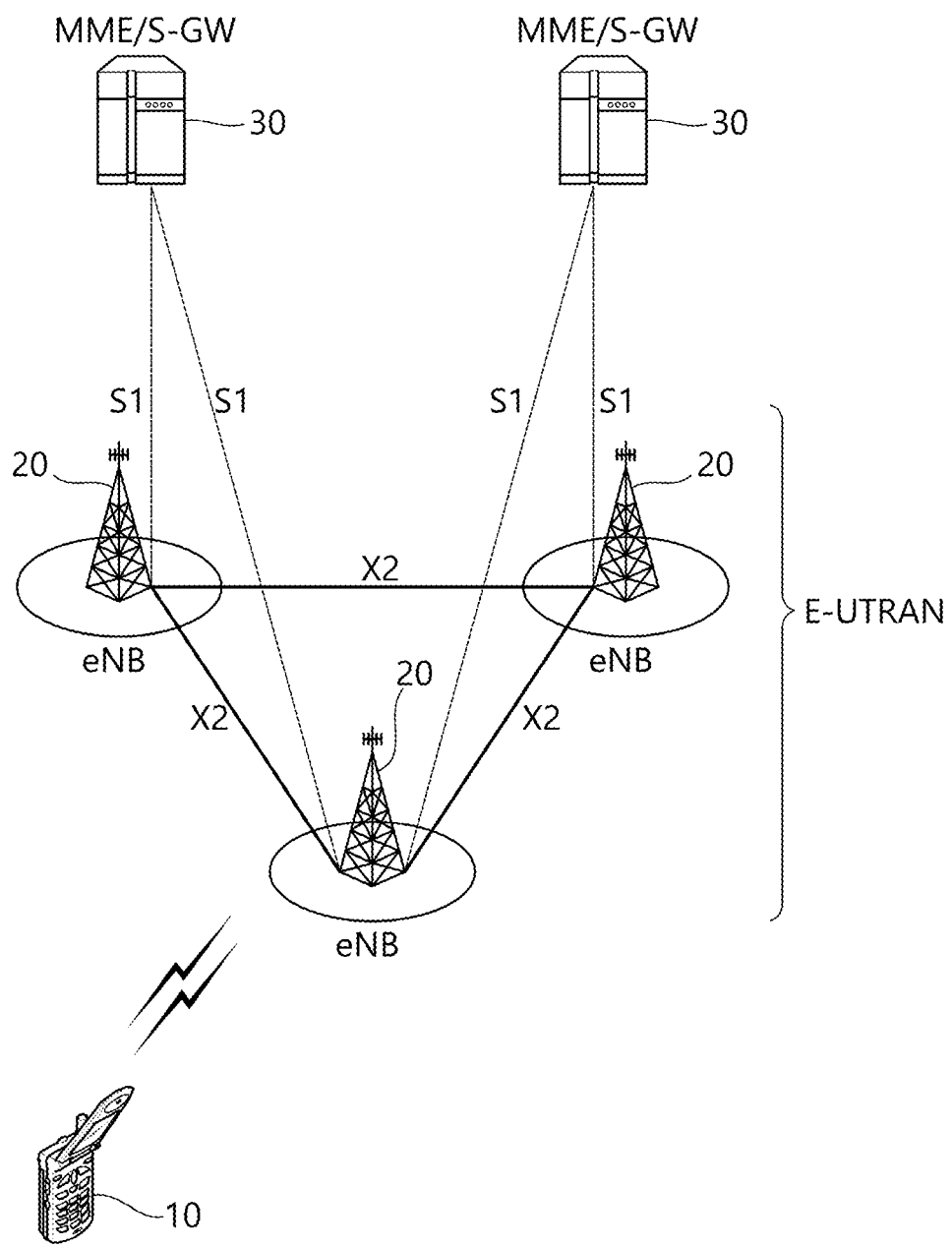
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a serving gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
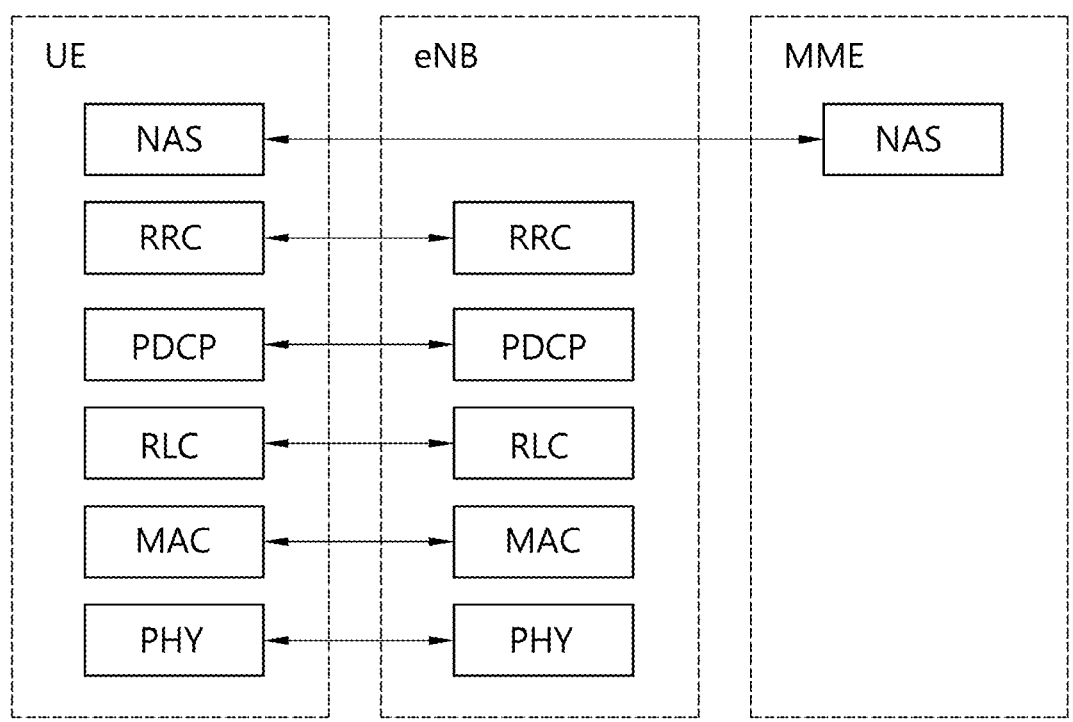
FIG. 2 shows a block diagram of a control plane protocol stack of an LTE system.
Figure 3:
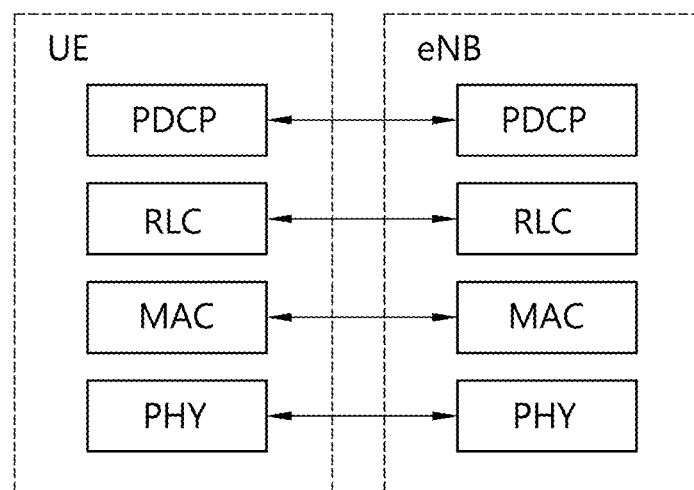
FIG. 3 shows a block diagram of a user plane protocol stack of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belongs to an upper layer of the RRC layer and serves to perform session management, mobility management, or the like.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, RRC state of UE and RRC connection method is described below.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

A non-access stratum (NAS) layer belongs to an upper layer of the RRC layer and serves to perform session management, mobility management, or the like.

In order to manage the mobility of the terminal in the NAS layer positioned on the control planes of the terminal and the MME, an EPS mobility management (EMM) registered state and an EMM deregistered state may be defined. The EMM registered state and the EMM deregistered state may be applied to the terminal and the MME. Like a case of turning on the power of the terminal for the first time, an initial terminal is in the EMM deregistered state and the terminal performs a process of registering the terminal in the corresponding network through an initial attach procedure in order to access the network. When the attach procedure is successfully performed, the terminal and the MME is transitioned to the EMM registered state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, a mobility of the UE is managed by the command of the network. If a location of the UE in the ECM-IDLE state becomes different from a location known to the network, the UE announces the location of the UE to the network through a tracking area update procedure.

Figure 4:
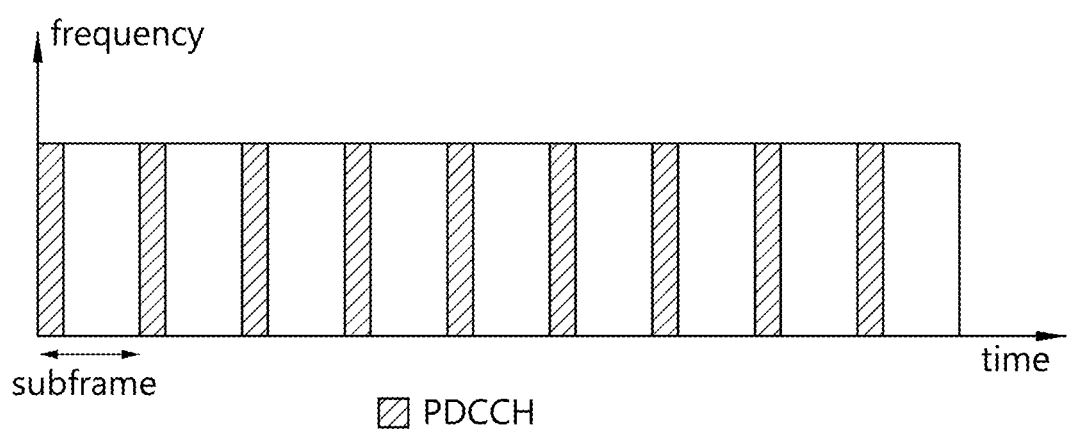
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Multimedia broadcast multicast services (MBMS) are described.

Figure 5:
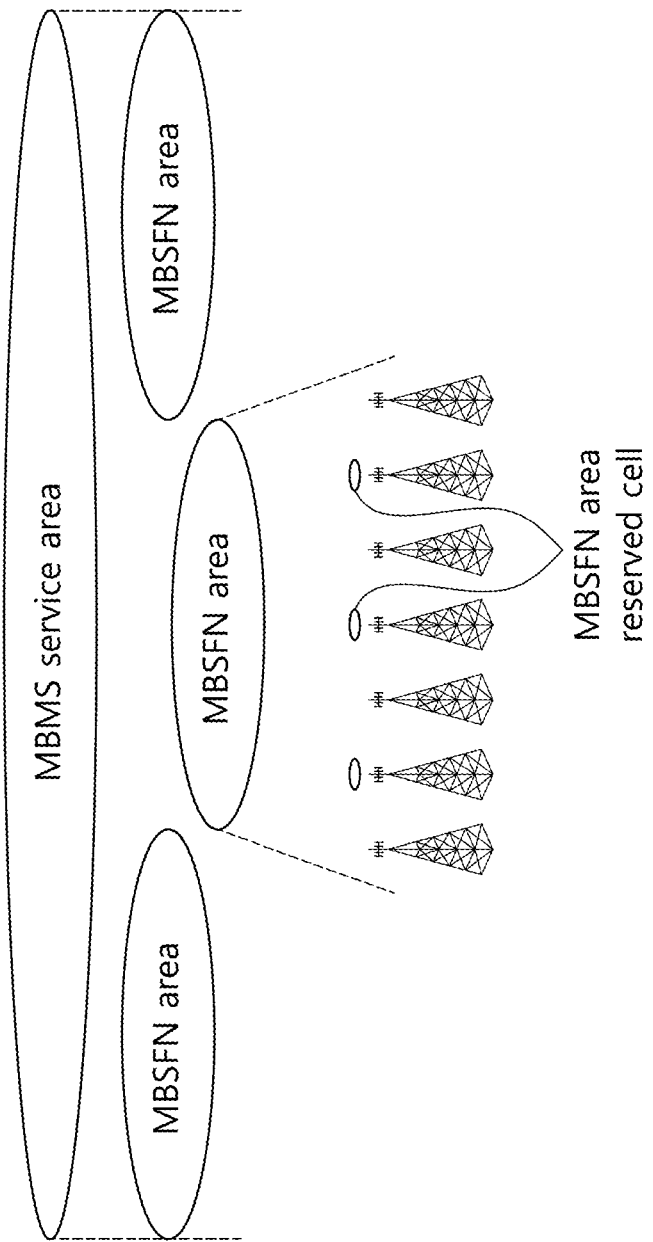
FIG. 5 shows MBMS definitions.

FIG. 5 shows MBMS definitions. For MBMS, the following definitions may be introduced.

Multicast-broadcast single-frequency network (MBSFN) synchronization area: This is an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e., when it knows which MBSFN area applies for the service(s) it is interested to receive.

MBSFN area reserved cell: This is a cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast and multicast service center (BM-SC) and the multi-cell/multicast coordination entity (MCE).

Synchronization period: The synchronization period provides the time reference for the indication of the start time of each synchronization sequence. The time stamp which is provided in each SYNC PDU is a relative value which refers to the start time of the synchronization period. The duration of the synchronization period is configurable.

Transmission of a MBMS in E-UTRAN uses either MBSFN transmission or SC-PTM transmission. The MCE makes the decision on whether to use SC-PTM or MBSFN for each MBMS session.

Figure 6:
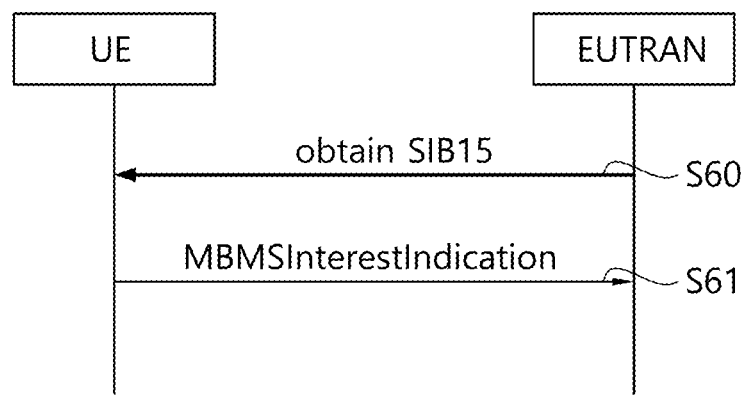
FIG. 6 shows an MBMS interest indication procedure.

FIG. 6 shows an MBMS interest indication procedure. An MBMS capable UE in RRC_CONNECTED may initiate the procedure in several cases including upon successful connection establishment, upon entering or leaving the service area, upon session start or stop, upon change of interest, upon change of priority between MBMS reception and unicast reception or upon change to a primary cell (PCell) broadcasting SystemInformationBlockType15.

Upon initiating the procedure, the UE shall:
1> if SystemInformationBlockType15 is broadcast by the PCell in step S90:
2> ensure having a valid version of SystemInformationBlockType15 for the PCell;
2> if the UE did not transmit an MBMSInterestIndication message since last entering RRC_CONNECTED; or
2> if since the last time the UE transmitted an MBMSInterestIndication message, the UE connected to a PCell not broadcasting SystemInformationBlockType15:
3> if the set of MBMS frequencies of interest is not empty:
4> initiate transmission of the MBMSInterestIndication message;
2> else:
3> if the set of MBMS frequencies of interest has changed since the last transmission of the MBMSInterestIndication message; or
3> if the prioritization of reception of all indicated MBMS frequencies compared to reception of any of the established unicast bearers has changed since the last transmission of the MBMSInterestIndication message:
4> initiate transmission of the MBMSInterestIndication message.

The UE may send an MBMSInterestIndication even when it is able to receive the MBMS services it is interested in i.e. to avoid that the network allocates a configuration inhibiting MBMS reception.

To determine MBMS frequencies of interest, the UE shall:
1> consider a frequency to be part of the MBMS frequencies of interest if the following conditions are met:
2> at least one MBMS session the UE is receiving or interested to receive via an MRB is ongoing or about to start (the UE may determine whether the session is ongoing from the start and stop time indicated in the user service description (USD)); and
2> for at least one of these MBMS sessions SystemInformationBlockType15 acquired from the PCell includes for the concerned frequency one or more MBMS service area identifiers (SAIs) as indicated in the USD for this session (the UE considers a frequency to be part of the MBMS frequencies of interest even though the E-UTRAN may (temporarily) not employ an MRB for the concerned session. i.e., the UE does not verify if the session is indicated on MCCH); and
2> the UE is capable of simultaneously receiving the set of MBMS frequencies of interest, regardless of whether a serving cell is configured on each of these frequencies or not; and
2> the supportedBandCombination the UE included in UE-EUTRA-Capability contains at least one band combination including the set of MBMS frequencies of interest.

Indicating a frequency implies that the UE supports SystemInformationBlockType13 acquisition for the concerned frequency, i.e., the indication should be independent of whether a serving cell is configured on that frequency. When evaluating which frequencies it can receive simultaneously, the UE does not take into account the serving frequencies that are currently configured, i.e., it only considers MBMS frequencies it is interested to receive. The term frequency does not indicate a physical frequency but covers the associated band(s), noting that additional bands may be indicated in SystemInformationBlockType1 (serving frequency) or SystemInformationBlockType15 (neighboring frequencies).

The UE shall set the contents of the MBMSInterestIndication message as follows:
1> if the set of MBMS frequencies of interest is not empty:
2> include mbms-FreqList and set it to include the MBMS frequencies of interest, using the E-UTRA absolute radio frequency channel number (EARFCN) corresponding with freqBandIndicator included in SystemInformationBlockType1, if applicable, and the EARFCN(s) as included in SystemInformationBlockType15. The mbms-FreqList merely indicates the physical frequencies the UE is interested to receive and does not imply the UE supports the associated band.
2> include mbms-Priority if the UE prioritizes reception of all indicated MBMS frequencies above reception of any of the unicast bearers. If the UE prioritizes MBMS reception and unicast data cannot be supported because of congestion on the MBMS carrier(s), the E-UTRAN may initiate release of unicast bearers. It is up to E-UTRAN implementation whether all bearers or only GBR bearers are released. The E-UTRAN does not initiate re-establishment of the released unicast bearers upon alleviation of the congestion.

The UE shall submit the MBMSInterestIndication message to lower layers for transmission. Accordingly, in step S91, the UE transmits the MBMSInterestIndication message to the E-UTRAN.

Figure 7:
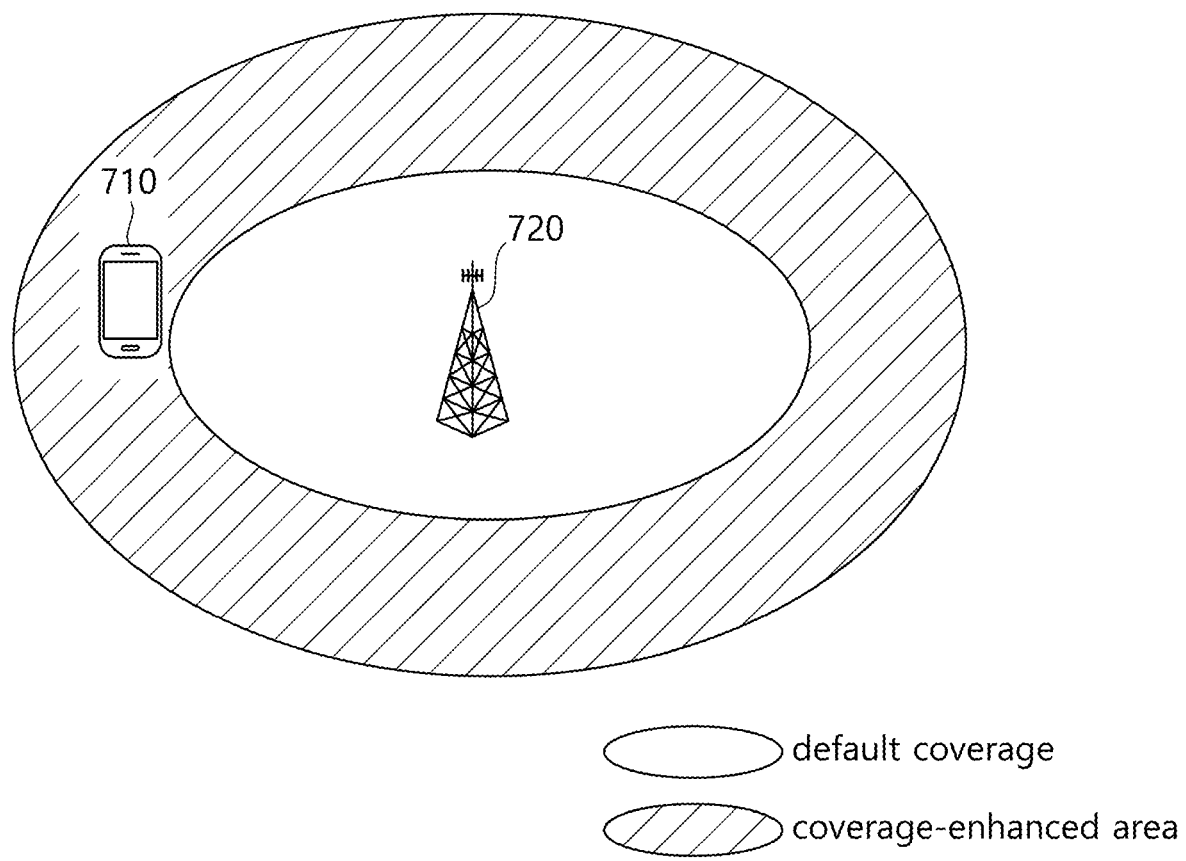
FIG. 7 shows an example of cell coverage enhancement.

FIG. 7 shows an example of cell coverage enhancement.

Recently, various coverage enhancement techniques, such as a repeated transmission method for a UE 710 per channel/signal, have been discussed. A coverage enhancement level (hereinafter, "CE level") may change depending on the location of a UE in a cell and the signal quality of the UE in the cell. A different CE level refers to a different number of repetitions (resources or subframes) required for successful uplink transmission and downlink reception. For a UE, it is advantageous in view of power consumption to stay in a cell requiring a smaller number of repetitions for successful uplink transmission and downlink reception. A smaller number of repetitions for successful uplink transmission and downlink reception may be needed particularly for an MTC UE. The MTC UE refers to a wireless device that provides MTC communication, and MTC communication refers to an information exchange between MTC UEs via a BS, which does not involve human interaction or an information exchange between an MTC UE and an MTC server through a BS. For a network, it is also advantageous to serve a UE that requires a smaller number of repetitions.

In the present invention, it is assumed that there is a plurality of CE levels for measurement including a level corresponding to no coverage enhancement. Further, it is assumed that the number of repetitions required for successful uplink transmission and downlink reception changes according to the CE level. The number of repetitions may be the amount of resources required for successful uplink transmission and downlink reception or may be the number of subframes required for successful uplink transmission and downlink reception. CE level 0 corresponds to no coverage enhancement, and the number of repetitions, the amount of resources, or the number of subframes required for successful uplink transmission and downlink reception may be increased as the CE level increases.

The UE may determine a CE level for transmission and reception in a particular cell using the following methods, and each threshold value may be provided by a serving cell.

(1) Determination of CE level based on RSRP/RSRQ: The UE may determine the CE level of a cell by comparing a measured RSRP/RSRQ result with a preset threshold value.

A network may set an RSRP/RSRQ threshold value for one or more CE levels so that the UE determines a CE level in a particular cell. For example, the network may signal a zeroth RSRP/RSRQ threshold value to distinguish CE level 0 from CE level 1, a first RSRP/RSRQ threshold value to distinguish CE level 1 from CE level 2, and a second RSRP/RSRQ threshold value to distinguish CE level 2 from CE level 3. Level 0 means that there is no coverage enhancement for measurement.

While measuring the serving cell and a neighboring cell, the UE may determine the CE level by comparing an RSRP/RSRQ result measured by the UE with the threshold value set by the network. When the measured result is lower than the zeroth RSRP/RSRQ threshold value, the UE may determine the CE level to be 0. When the measured result is lower than the first RSRP/RSRQ threshold value and is higher than the zeroth RSRP/RSRQ threshold value, the UE may determine the CE level to be 1. When the measured result is lower than the second RSRP/RSRQ threshold value and is higher than the first RSRP/RSRQ threshold value, the UE may determine the CE level to be 2. Similarly, when the measured result is higher than the second RSRP/RSRQ threshold value, the UE may determine the CE level to be 3.

(2) Determination of CE level based on primary synchronization signal (PSS)/secondary synchronization signal (SSS): The UE may determine the CE level of a cell by comparing the time to obtain PSS/SSS with a preset threshold value.

The network may set a time threshold value for one or more CE levels so that the UE determines a CE level in a particular cell. For example, the network may signal a zeroth time threshold value to distinguish CE level 0 from CE level 1, a first time threshold value to distinguish CE level 1 from CE level 2, and a second time threshold value to distinguish CE level 2 from CE level 3. Level 0 means that there is no coverage enhancement for measurement.

While measuring the serving cell and a neighboring cell, the UE may determine the CE level by comparing the time to obtain PSS/SSS with the time threshold value set by the network. When the time to obtain PSS/SSS is lower than the zeroth time threshold value, the UE may determine the CE level to be 0. When the time to obtain PSS/SSS is longer than the zeroth time threshold value and is shorter than the first time threshold value, the UE may determine the CE level to be 1. When the time to obtain PSS/SSS is longer than the first time threshold value and is shorter than the second time threshold value, the UE may determine the CE level to be 2. Similarly, when the time to obtain PSS/SSS is longer than the second time threshold value, the UE may determine the CE level to be 3.

(3) Determination of CE level based on downlink message: The UE may determine the CE level of a cell by comparing the number of repetitions required to successfully receive a downlink message with a preset threshold value.

(4) Determination of CE Level Based on uplink message: The UE may determine the CE level of a cell by comparing the number of repetitions required to successfully transmit an uplink message with a preset threshold value.

In this description, it is assumed that the CE level may be set to 0 to 3, without being limited thereto. Instead, it is to be understood that one or more levels may be set.

When a UE located in enhanced coverage is interested in an MBMS service, the transmission of the MBMS service needs to be sufficiently repeated in order to support the CE level of the UE. However, according to the related art, a network does not know the CE level of the UE interested in the MBMS service and cannot identify the appropriate number of times to repeatedly transmit the MBMS service to the UE.

Hereinafter, a method for a UE to receive an MBMS service according to one embodiment of the present invention will be described. According to the embodiment of the present invention, when the UE fails to receive an MBMS service of interest, the UE reports the CE level of the UE to a network, and thus the network guarantees the minimum number of repetitions required for the UE and the UE in the enhanced coverage can properly receive the MBMS service. In the present embodiment, when the UE fails to receive an MBMS service of interest, it may be considered that the reception of the MBMS service has failed because the number of times the MBMS service is repeatedly transmitted is insufficient. In this description, the number of repetitions of the UE may be determined depending on the CE level of the UE. The number of repetitions of the MBMS service may be determined depending on the CE level of the MBMS service. Therefore, it should be noted that although the embodiment is illustrated on the basis of the CE level of the UE and the CE level of the MBMS service in the present description, the embodiment may also be applied to the number of transmissions by the UE and the number of MBMS transmissions, and vice versa.

Figure 8:
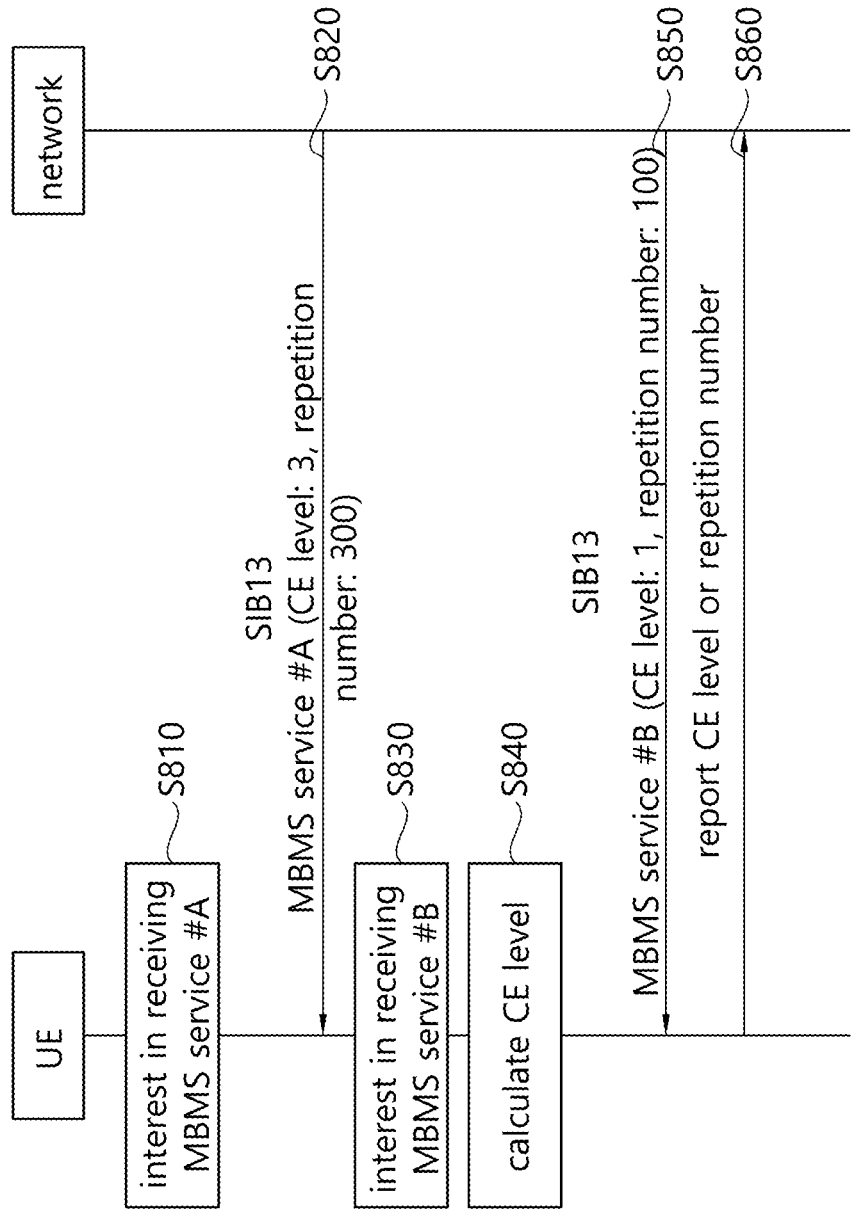
FIG. 8 is a flowchart illustrating a method in which a UE receives an MBMS service according to one embodiment of the present invention.

FIG. 8 is a flowchart illustrating a method in which a UE receives an MBMS service according to one embodiment of the present invention.

First, in this embodiment, the UE may be located within enhanced coverage and may be interested in an MBMS service. That is, the UE may be interested in receiving the MBMS service through SC-PTM transmission or MBSFN transmission.

Next, the UE may identify whether the MBMS service of interest is provided on a current frequency and the CE level/number of repetitions (repetition level) of the MBMS service. Specifically, the UE may identify the foregoing information by reading an MCCH, an SC-MCCH, or a PDCCH. The CE level and the number of repetitions of the MBMS service are indicators indicating the quality of a channel via which the MBMS service is provided and may be set by a network. That is, the CE level of the MBMS service indicates a CE level that a BS supports in order to successfully provide the MBMS service. The number of repetitions of the MBMS service indicates the number of repeated transmissions that the BS supports in order to successfully provide the MBMS service.

When the CE level or the number of repetitions of the MBMS service of interest is lower than the CE level or the number of repetitions of the UE, the UE may determine that the UE cannot receive the MBMS service and may report the CE level or the required number of repetitions of the UE to the network. That is, the UE may determine that it is impossible for the UE to receive the MBMS service because the CE level or the required number of repetitions of the UE is not satisfied. When the UE is in RRC idle mode, the UE may initiate an RRC connection establishment procedure in order to report the CE level or the number of repetitions of the UE.

The UE may report, to the network, the CE level or the required number of repetitions of the UE per MBMS service, TMGI, frequency for providing the MBMS service, or MBSFN area. For example, the UE may determine whether the UE can receive the MBMS service on a first frequency among a plurality of frequencies on which the MBMS service is provided, and may report the CE level or the number of repetitions of the UE on the first frequency to the network when it is determined that the UE cannot receive the MBMS service on the first frequency.

The UE may periodically calculate the CE level and/or the required number of repetitions of the UE not only for a serving frequency but also for all the MBMS frequencies on which the MBMS service of interest is provided. Whenever the CE level or the required number of repetitions of the UE is changed after calculation, the UE may identify whether the UE can receive the MBMS service of interest through SC-PTM transmission or MBSFN transmission based on the changed CE level or required number of repetitions of the UE. When the CE level or the number of repetitions of the MBMS service of interest is lower than the CE level or the required number of repetitions of the UE, that is, when the UE determines that the UE cannot receive the MBMS service of interest for this reason, the UE may report the CE level or the required number of repetitions of the UE to the network.

According to one embodiment, reporting the CE level or the required number of repetitions of the UE may be triggered when the MBMS service of interest is being provided on a non-serving frequency and the CE level or the number of repetitions of the MBMS service is lower than the CE level or the number of repetitions of the UE on the non-serving frequency. That is, when the UE determines that it is impossible to receive the MBMS service of interest on the non-serving frequency because the CE level or the number of repetitions of the MBMS service is lower than the CE level or the number of repetitions of the UE, the UE may perform reporting.

Further, according to one embodiment of the present invention, a report on the CE level or the number of repetitions may be transmitted to the network through an MBMS interest indication message or an MBMS counting response message.

Hereinafter, a method for reporting a CE level according to one embodiment of the present invention will be described with reference to FIG. 8.

It is assumed that the UE is interested in receiving MBMS service #A provided on a first frequency through MBSFN transmission or SC-PTM transmission (S810).

The UE may receive SIB13 to identify whether the UE can receive MBMS service #A through MBSFN transmission or single cell-point to multipoint (SC-PTM) transmission (S820). system information block type 13 (SIB13) may include information necessary to obtain MBMS control information associated with one or more mobile broadcast single frequency network (MBSFN) areas. In one example, the CE level of the UE on the first frequency may be 1, and the number of repetitions required for MBMS transmission to the UE may be 100. In addition, the CE level of MBMS service #A may be 3, and the number of repetitions of MBMS service #A may be 300. In this example, the UE may determine that the UE can receive MBMS service #A through MBSFN transmission or SC-PTM transmission, in which case the UE may not report the CE level and/or the number of repetitions of the UE to the network.

Next, it is assumed that the UE becomes interested in receiving MBMS service #B provided on a second frequency through MBSFN transmission or SC-PTM transmission (S830).

The UE may calculate the CE level or the number of repetitions of the UE on the second frequency (S840). In one example, the CE level of the UE on the second frequency may be 3, and the number of repetitions required for successful transmission of the MBMS service to the UE may be 300.

The UE may receive SIB13 to identify whether the UE can receive MBMS service #A through MBSFN transmission or SC-PTM transmission (S850). In one example, the CE level of MBMS service #B may be 1, and the number of repetitions of MBMS service #B may be 100.

In this example, the UE may determine that the UE cannot receive MBMS service #B through MBSFN transmission or SC-PTM transmission, in which case the UE may report the CE level and/or the number of repetitions of the UE to the network (S860). That is, the UE may report, to the network, that the CE level and the number of repetitions of the UE are 3 and 300, respectively.

Further, the CE level and the number of repetitions of the UE may be reported per frequency for providing the MBMS service. For example, the UE may report, to the network, that the CE level of the UE on the first frequency is 1 and the number of repetitions required for the UE on the first frequency is 100. Further, the UE may report, to the network, that the CE level of the UE on the second frequency is 3 and the number of repetitions required for the UE on the second frequency is 300. In addition, this reporting procedure may be triggered under the condition that a frequency for providing the MBMS service is different from a serving frequency for the UE.

Figure 9:
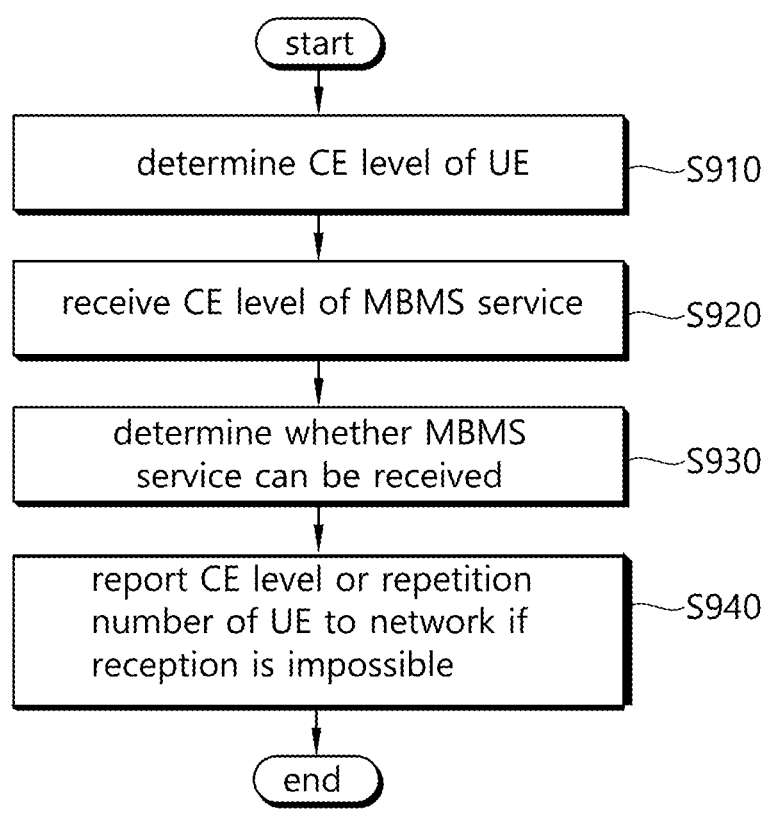
FIG. 9 is a flowchart illustrating a method in which a UE receives an MBMS service according to one embodiment of the present invention.

FIG. 9 is a flowchart illustrating a method in which a UE receives an MBMS service according to one embodiment of the present invention.

The UE may determine the CE level of the UE on a frequency via which the MBMS service of interest is provided (S910). The CE level of the UE may be determined based on reference signal received power (RSRP) or reference signal received quality (RSRQ) measured by the UE.

The UE may receive the CE level of the MBMS service supported by a network (S920). According to one embodiment, the UE may obtain the CE level of the MBMS service by reading a multicast control channel (MCCH), an single cell-MCCH (SC-MCCH), or a physical downlink control channel (PDCCH). In addition, the CE level of the MBMS service may be received via SIB13.

The UE may determine whether the UE can receive the MBMS service by comparing the CE level of the UE with the CE level of the MBMS service (S930). Specifically, when the CE level of the MBMS service is lower than the CE level of the UE, the UE may determine that the UE cannot receive the MBMS service. That is, when the CE level of the MBMS service is lower than the CE level of the UE, the UE may assume that the UE cannot receive the MBMS service because the required CE level is not supported.

When it is determined that the UE cannot receive the MBMS service, the UE may report the CE level of the UE to the network (S940). In addition, when it is determined that the UE cannot receive the MBMS service, the UE may report, to the network, the number of repetitions required for the UE indicated by the CE level along with the CE level of the UE. According to one embodiment, the UE may report, to the network, the CE level and/or the number of repetitions of the UE per MBMS service, TMGI, frequency for providing the MBMS service, or MBSFN area. In addition, the UE may report the CE level and/or the number of repetitions of the UE to the network through an MBMS interest indication message or an MBMS counting response message. The UE may trigger reporting under the condition that a frequency for providing the MBMS service is different from a current serving frequency for the UE. When the UE is in the RRC idle state, the UE may initiate an RRC connection establishment procedure in order to perform reporting to the network.

Figure 10:
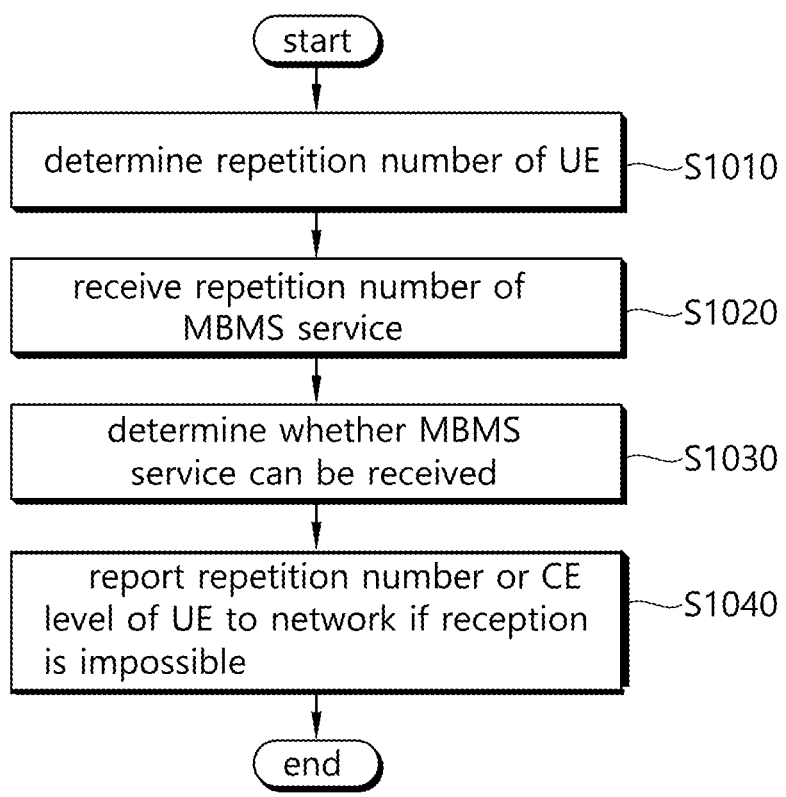
FIG. 10 is a flowchart illustrating a method in which a UE receives an MBMS service according to another embodiment of the present invention.

FIG. 10 is a flowchart illustrating a method in which a UE receives an MBMS service according to another embodiment of the present invention.

The UE may measure the number of repetitions required for the UE on a frequency via which the MBMS service of interest is provided (S1010). The number of repetitions of the UE may be determined based on reference signal received power (RSRP) or reference signal received quality (RSRQ) measured by the UE.

The UE may receive the number of repetitions of the MBMS service supported by a network (S1020). According to one embodiment, the UE may obtain the number of repetitions of the MBMS service by reading an MCCH, an SC-MCCH, or a PDCCH. In addition, the number of repetitions of the MBMS service may be received via SIB13.

The UE may determine whether the UE can receive the MBMS service by comparing the number of repetitions of the UE with the number of repetitions of the MBMS service (S1030). Specifically, when the number of repetitions of the MBMS service is less than the number of repetitions of the UE, the UE may determine that the UE cannot receive the MBMS service. That is, when the number of repetitions of the MBMS service is less than the number of repetitions of the UE, the UE may assume that the UE cannot receive the MBMS service because the required number of repetitions is not supported by the network.

When it is determined that the UE cannot receive the MBMS service, the UE may report the number of repetitions of the UE to the network (S1040). In addition, when it is determined that the UE cannot receive the MBMS service, the UE may report, to the network, a corresponding CE level along with the number of repetitions of the UE. According to one embodiment, the UE may report, to the network, the number of repetitions of the UE per MBMS service, TMGI, frequency for providing the MBMS service, or MBSFN area. In addition, the UE may report the number of repetitions of the UE to the network through an MBMS interest indication message or an MBMS counting response message. The UE may trigger reporting under the condition that a frequency for providing the MBMS service is different from a current serving frequency for the UE. When the UE is in the RRC idle state, the UE may initiate an RRC connection establishment procedure in order to perform reporting to the network.

Figure 11:
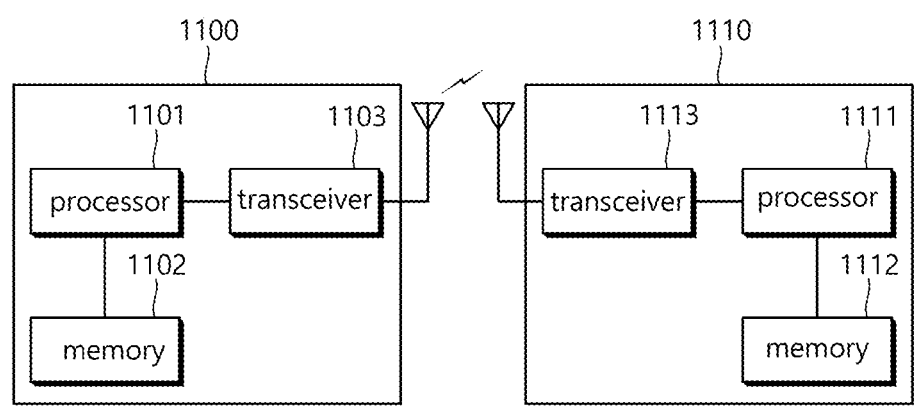
FIG. 11 is a block diagram illustrating a wireless communication system in which an embodiment of the present invention can be implemented.

FIG. 11 is a block diagram illustrating a wireless apparatus in which an embodiment of the present invention can be implemented.

A BS 1100 includes a processor 1101, a memory 1102, and a radio frequency (RF) unit 1103. The memory 1102 is coupled to the processor 1101, and stores a variety of information for driving the processor 1101. The RF unit 1103 is coupled to the processor 1101, and transmits and/or receives a radio signal.

The processor 1101 implements the proposed functions, procedures, and/or methods. In the aforementioned embodiments, an operation of the BS may be implemented by the processor 1101.

A UE 1110 includes a processor 1111, a memory 1112, and an RF unit 1113. The memory 1112 is coupled to the processor 1111, and stores a variety of information for driving the processor 1111. The RF unit 1113 is coupled to the processor 1111, and transmits and/or receives a radio signal. The processor 61 implements the proposed functions, procedures, and/or methods. In the aforementioned embodiments, an operation of the UE 1110 may be implemented by the processor 1111.

The processors 1111 may include application-specific integrated circuit (ASIC), other chipset, logic circuit and/or data processing device. The memories may include read-only memory (ROM), random access memory (RAM), flash memory, memory card, storage medium and/or other storage device. The RF units may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for performing wireless communication by a wireless device in a wireless communication system, the method comprising:
   determining a coverage enhancement (CE) level of the wireless device on a frequency via which a multimedia broadcast multicast service (MBMS) service of interest is provided;
   receiving information regarding both a CE level of the MBMS service supported by a network and a number of repetitions required for the MBMS service included in system information block type 13 (SIB13); and
   transmitting, to the network, the CE level of the wireless device and a number of repetitions required for the wireless device related with the CE level of the wireless device based on (i) the CE level of the MBMS service being lower than the CE level of the wireless device, (ii) the number of repetitions required for the MBMS service being less than the number of repetitions required for the wireless device, and (iii) the frequency via which the MBMS service is provided being different from a current serving frequency for the wireless device, wherein the CE level of the wireless device and the number of repetitions required for the wireless device are transmitted through an MBMS service interest indication message, and wherein the CE level of the wireless device or the number of repetitions required for the wireless device is transmitted per temporary mobile group identity (TMGI).

2. The method of claim 1, wherein the CE level of the wireless device is determined based on reference signal received power (RSRP) or reference signal received quality (RSRQ) measured by the wireless device.

3. The method of claim 1, wherein the CE level of the MBMS service is received through a multicast control channel (MCCH), a single cell-MCCH (SC-MCCH), or a physical downlink control channel (PDCCH).

4. The method of claim 1, further comprising:
initiating a radio resource control (RRC) connection establishment procedure before the transmitting based on the wireless device being in an RRC idle state.

5. The method of claim 1, further comprising:
determining whether the MBMS service can be received through a multimedia broadcast single frequency network (MBSFN) transmission or a single cell-point to multi point (SC-PTM) transmission.

6. A wireless device configured to operate in a wireless communication system, the wireless device comprising:
a memory;
a transceiver; and
at least one processor operatively coupled to the memory and the transceiver, wherein the processor is configured to:
determine a coverage enhancement (CE) level of the wireless device on a frequency via which a multimedia broadcast multicast service (MBMS) service of interest is provided;
receive information regarding both a CE level of the MBMS service supported by a network and a number of repetitions required for the MBMS service included in system information block type 13 (SIB 13); and
transmit, to the network, the CE level of the wireless device and a number of repetitions required for the wireless device related with the CE level of the wireless device based on (i) the CE level of the MBMS service being lower than the CE level of the wireless device, (ii) the number of repetitions required for the MBMS service being less than the number of repetitions required for the wireless device, and (iii) the frequency via which the MBMS service is provided being different from a current serving frequency for the wireless device, wherein the CE level of the wireless device and the number of repetitions required for the wireless device are transmitted through an MBMS service interest indication message, and wherein the CE level of the wireless device or the number of repetitions required for the wireless device is transmitted per temporary mobile group identity (TMGI).

* * * * *